United States Patent Office 2,720,996
Patented Oct. 18, 1955

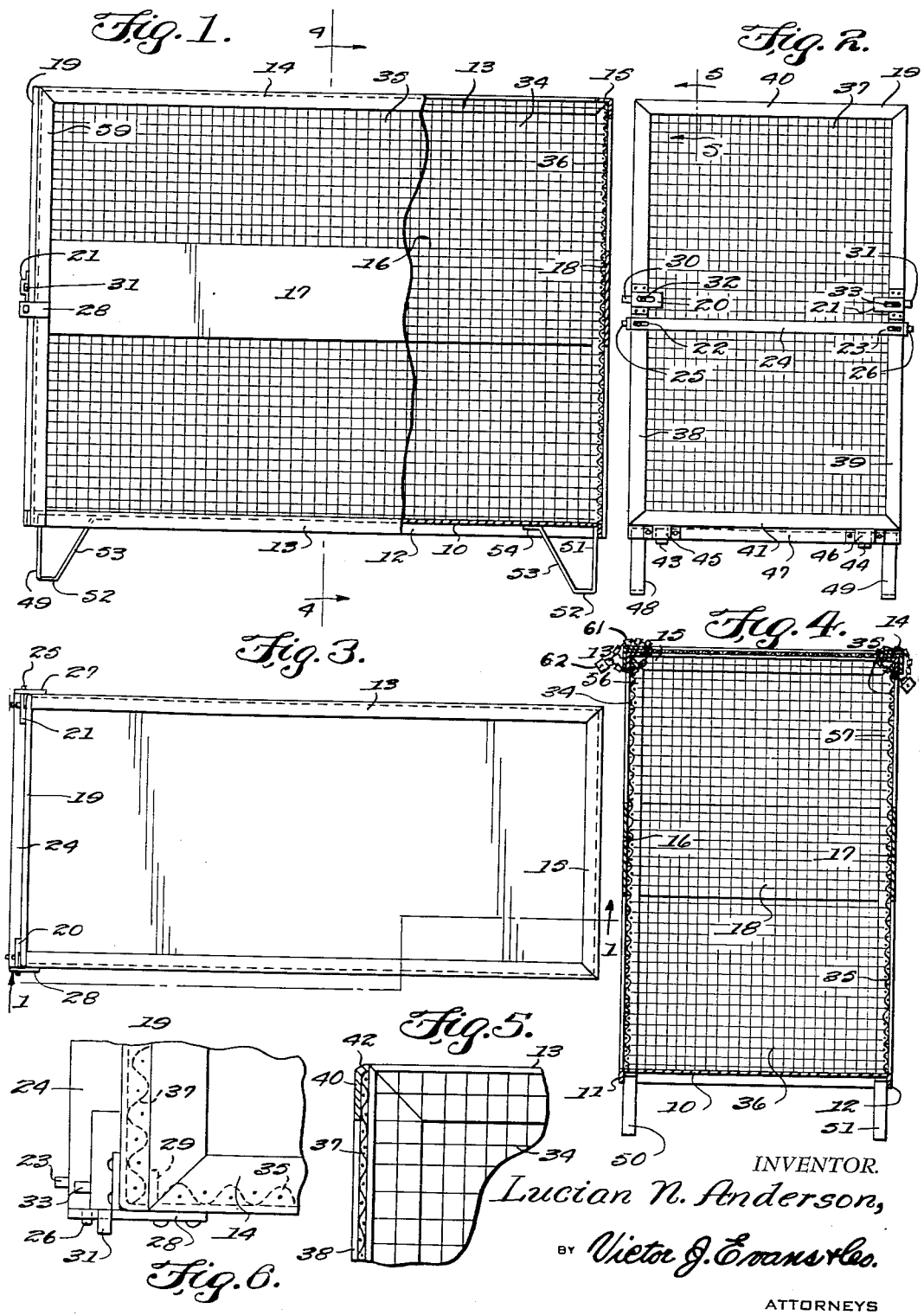

2,720,996

PORTABLE PACKING CASE

Lucian N. Anderson, Babbitt, Nev.

Original application November 19, 1947, Serial No. 786,948, now Patent No. 2,575,326, dated November 20, 1951. Divided and this application June 12, 1951, Serial No. 231,213

2 Claims. (Cl. 220—1.5)

This invention relates to cargo handling equipment of the type in which miscellaneous cargo is packed into containers and the containers placed in carriers such as trucks, freight cars, and the like, and in particular the container of this invention includes a frame having wire mesh on the sides, ends and top, with the bottom formed with a continuous plate and with the top removable and the frame at one end removably connected to the sides providing a door.

This is a divisional application being divided from my co-pending application filed November 19, 1947, with the Serial Number 786,948, now Patent No. 2,575,326, issued November 20, 1951.

The co-pending application includes the combination of containers of this type with spreading mechanisms for wedging the containers in carrier bodies and this application includes the construction of the container with means for securing the door frame in position on the container.

The purpose of this invention is to provide means for removably attaching a door formed with wire mesh stretched over a steel frame in the ends of side walls of the container whereby the container with the door in position may be handled by a sling or conveyed as a unit on a truck or the like.

Various types of containers of this type have been used for shipping cargo and particularly merchandise of various shapes and sizes but where the containers are formed of wood comparatively heavy beams are required and where they are formed of metal it is difficult to brace the supporting frames without utilizing valuable space.

With this thought in mind this invention contemplates a skeleton type of container having sides formed with rectangular shaped frames and with the frames covered with wire mesh and reinforced by longitudinally disposed side plates and with similar frames on the ends wherein one of the end frames is permanently attached to the sides and the other removably attached to provide a door, and these frames are mounted upon a continuous plate forming a bottom, the bottom plate being spaced from the floor or other surface with legs formed of straps.

The object of this invention is, therefore, to provide means for constructing a metal shipping container whereby comparatively light weight material may be used and wherein the frame members are reinforced without diagonal braces extended across the interior of the container.

Another object of the invention is to provide means for removably attaching a metal frame to one end of a comparatively open container to provide a door wherein the edges of the door are latched to edges of the side walls of the container.

A further object of the invention is to provide a box-like container for packing cargo for shipping which is of a comparatively simple and economical construction.

With these and other objects and advantages in view the invention embodies a base plate, rectangular shaped in plan having depending legs formed of strap iron, with angle iron side and end members, with the side and end members and a cover covered with wire mesh and reinforced with centrally positioned plates, and with latches for securing the end member at one end of the device to the edges of the side members.

Other features and advantages of the invention will appear from the following description taken in connection with the drawings wherein:

Figure 1 is a side elevational view of the improved cargo container taken on line 1—1 of Figure 3 with parts of the container broken away and shown in section.

Figure 2 is an end elevational view looking toward the end of the container in which the door is positioned.

Figure 3 is a plan view of the container with the cover removed.

Figure 4 is a vertical cross section through the container taken on line 4—4 of Figure 1.

Figure 5 is a detail showing a cross section taken on line 5—5 of Figure 2 with the cover removed, and illustrating the construction of the upper edge of the door.

Figure 6 is a detail showing a plan view of one of the corners in the open end of the container illustrating a latch for holding the door in position and also a latch having a pin extended for engagement with retaining means in the side wall of a carrier or the like.

Referring now to the drawings wherein like reference characters denote corresponding parts the improved cargo container of this invention includes a base plate 10, the edges of which are provided with flanges 11 and 12 that extend downwardly to reinforce the ends and sides, angle irons 13 and 14 that extend along the upper edges of the sides to provide supporting rails, an angle iron 15 extended across the upper corner of the back reinforcing plates 16 and 17 extended along the sides, a similar plate 18 extended across one end, a door frame 19 having latches 20 and 21 positioned thereon for retaining the frame in position in a carrier, as more specifically defined in my Patent 2,575,326, and also having latches 22 and 23 for temporarily retaining the door in position.

The latches 22 and 23 are positioned in the ends of a transversely disposed bar 24 which extends across the door 19 and pins 25 and 26 that extend from the ends of the latches extend through openings in bars 27 and 28, respectively that extend from the edges of the sides of the container. As illustrated in Figure 6 the members of the side frames are provided with inwardly extended flanges as indicated by the numeral 29 and the door is held against these flanges by the pins 25 and 26 of the latches in the ends of the bar 24.

The latches 20 and 21 are provided with pins 30 and 31 that are slidably mounted in the latches and these pins are controlled by buttons 32 and 33 whereby the pins may be drawn into the latches or may extend therefrom to engage retaining elements in the side or sides of a carrier or the like, as disclosed in my Patent 2,575,326.

The sides of the container are covered with wire mesh as indicated by the numerals 34 and 35, the closed end is provided with wire mesh 36 and the door, with wire mesh 37.

The wire mesh of the door is secured in a frame, as illustrated in Figure 5, having vertically disposed side rails 38 and 39, an upper rail 40 and a lower rail 41 and, also as illustrated in Figure 5, the outer edges of the rails are crimped inwardly to provide a binding for the wire mesh whereby the edge of the wire mesh is covered with a flange 42.

The rail 41 on the lower end of the door is provided with bars 43 and 44 that are freely held in straps providing sockets 45 and 46, respectively on a flange 47 at the forward end of the base plate 10.

The container is supported by legs 48 and 49 at the front and 50 and 51 at the back and, in the design as shown in the drawing these legs are formed of strap iron with the lower ends bent under to provide straight sections 52 and from the straight sections the straps extend upwardly forming inclined sections 53 and flanges 54 on the upper ends of the sections 53 are secured to the lower surface of the base plate 10.

The base plate 10 is also provided with a flange 55 at the rear which provides reinforcing means and posts 56 and 57 extend upwardly from the corners of the base plate to the ends of the side rails 13 and 14 at the inner end or rear of the container.

Similar posts 58 and 59 are provided at the forward end and, as illustrated in Figure 1 the flanges of these posts extend downwardly over flanges on the edges of the base, whereby the posts may be secured, preferably by welding, to the base.

The reinforcing side plates 16, 17 and 18 are secured to the posts in a similar manner and the edges of the wire mesh are secured to the posts, base, and upper side rails.

The upper end of the container is closed with a wire mesh panel 60 that is secured in position with chains 61 and locks 62, and with the parts as shown, cargo packed in the container may be sealed and locked for shipment.

With the parts arranged in this manner a rectangular shaped or box-like frame is provided with comparatively light weight frame members covered with wire mesh and reinforced by side plates which prevent bending of the mesh in the intermediate parts of the frame and with cargo, merchandise, and the like packed in these frames, they are positioned as units in carriers such as truck bodies, freight cars and the like.

It will be understood that modifications may be made in the design and arrangement of the parts without departing from the spirit of the invention.

What is claimed is:

1. In a cargo carrier, which includes an open box-like frame having a base plate and depending flanges on the edges, legs positioned under and supporting the base plate at the corners thereof, side frames including vertically positioned posts at the corners with the upper ends of the posts connected by horizontally disposed rails mounted on the base plate, inwardly extending flanges on said side frames, an upper rail connecting the posts at one end of the frame, the improvement which comprises a rectangular shaped frame providing a door positioned on the open end of the frame in abutting relation with said inwardly extending flanges, wire mesh covering the door, sides of the frame and also the end of the frame opposite to that on which the door is positioned, and latches securing the door to the said posts forming the adjacent ends of the sides of the frame.

2. In a cargo carrier, which includes a box-like frame having a base plate supported on legs with depending flanges on the sides and ends of the base plate, with side frames including posts connected by upper rails extended upwardly from the base plate and a rail connecting the upper ends of the posts at one end of the frame, said side frames having inwardly extending flanges with wire mesh covering the sides and ends of the frame on which the rail connecting the upper ends of the post is positioned, and with reinforcing plates positioned midway of the height of the frame and connecting the posts on the sides and across one end of the frame, the improvement comprising a rectangular shaped frame covered with wire mesh providing a door for one end of the frame, the said rectangular shaped frame being positioned in abutting relation to said inwardly extending flanges, a reinforcing bar extended across the door, latch holding elements mounted on the sides of the frame and positioned to coact with the ends of the bar extended across the door for retaining the door in position on the end of the frame, and latch elements with pins extended therefrom also mounted on the door and positioned with the pins thereof adapted to extend beyond the sides of the frame.

References Cited in the file of this patent

UNITED STATES PATENTS

| 479,810 | Johnson | Aug. 2, 1892 |
| 1,086,670 | Jory et al. | Feb. 10, 1914 |
| 1,581,689 | Perin | Apr. 20, 1926 |
| 1,740,000 | Andrews et al. | Dec. 17, 1929 |
| 1,878,459 | Bliss, Jr., et al. | Sept. 20, 1932 |
| 1,942,713 | Klinka | Jan. 9, 1934 |
| 2,466,226 | Gilbertie | Apr. 5, 1949 |

FOREIGN PATENTS

| 452,667 | Great Britain | Aug. 27, 1936 |
| 530,449 | Great Britain | Dec. 12, 1940 |